United States Patent [19]

Meier

[11] Patent Number: 5,947,491

[45] Date of Patent: *Sep. 7, 1999

[54] BRAKE AND RETRACTABLE REAR STABILIZER APPARATUS FOR A HAND DOLLY

[76] Inventor: James W. Meier, 2538 W. Townley, Phoenix, Ariz. 85021

[*] Notice: This patent is subject to a terminal disclaimer.

[21] Appl. No.: 09/075,920

[22] Filed: May 11, 1998

Related U.S. Application Data

[63] Continuation of application No. 08/666,607, Jun. 18, 1996, Pat. No. 5,779,251, which is a continuation of application No. 08/179,259, Jan. 10, 1994, abandoned.

[51] Int. Cl.$^6$ .................................. B62B 1/08; B60T 1/04
[52] U.S. Cl. ............................ 280/47.2; 188/22; 188/30; 280/47.27
[58] Field of Search .................................. 280/47.2, 5.28, 280/5.32, 5.2, 47.24, 47.16, 47.27, 47.38, 47.19, 47.33, 64, 33.994, 30; 188/16, 19, 20, 21, 22, 30, 31, 68

[56] References Cited

U.S. PATENT DOCUMENTS

| | | | |
|---|---|---|---|
| 112,538 | 3/1871 | Brown | 188/30 |
| 292,790 | 2/1884 | Burleigh et al. | 188/22 |
| 627,284 | 6/1899 | Walker | 188/22 |
| 820,274 | 5/1906 | Watley | 280/47.2 |
| 902,794 | 11/1908 | Anderson | 280/47.27 |
| 1,106,321 | 8/1914 | Sivard | 188/30 |
| 1,800,587 | 4/1931 | Appleby | 188/30 |
| 2,243,915 | 6/1941 | Mueller | 280/47.2 |
| 3,064,990 | 11/1962 | Salvucci | 280/47.2 |
| 3,647,236 | 3/1972 | Hayes | 280/47.2 |
| 4,284,286 | 8/1981 | Lewallen | 280/30 |
| 4,630,837 | 12/1986 | Kazmark | 280/47.2 |
| 5,779,251 | 7/1998 | Meier | 280/47.2 |

*Primary Examiner*—Anne Marie Boehler
*Attorney, Agent, or Firm*—H. Gordon Shields

[57] ABSTRACT

Hand truck or dolly apparatus includes a main frame and a pair of main tires and brake elements secured to the main frame, including a pair of plates movable against the tires. The brake plates are actuable either by a foot operation or by hand operation. The brake plates may be set only by foot operation, while the hand operation of the brakes moves the brake plates against the wheels for a "feathering" brake action. The dolly apparatus also includes a pair of rear stabilizer wheels disposed on a frame pivotally secured to the main frame of the dolly or hand truck. The stabilizer wheels are movable between a down and use position and an up and storage position.

10 Claims, 2 Drawing Sheets

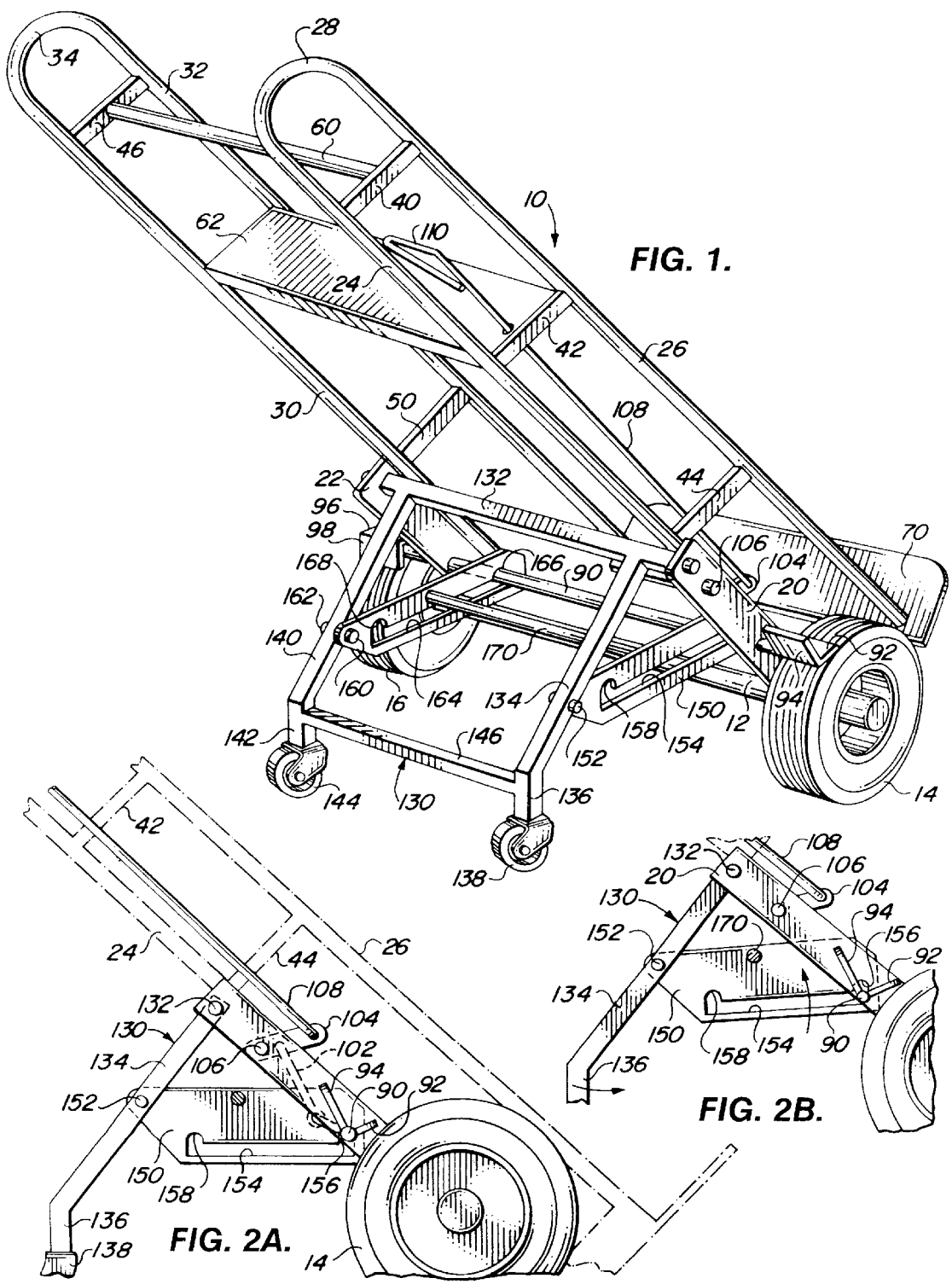

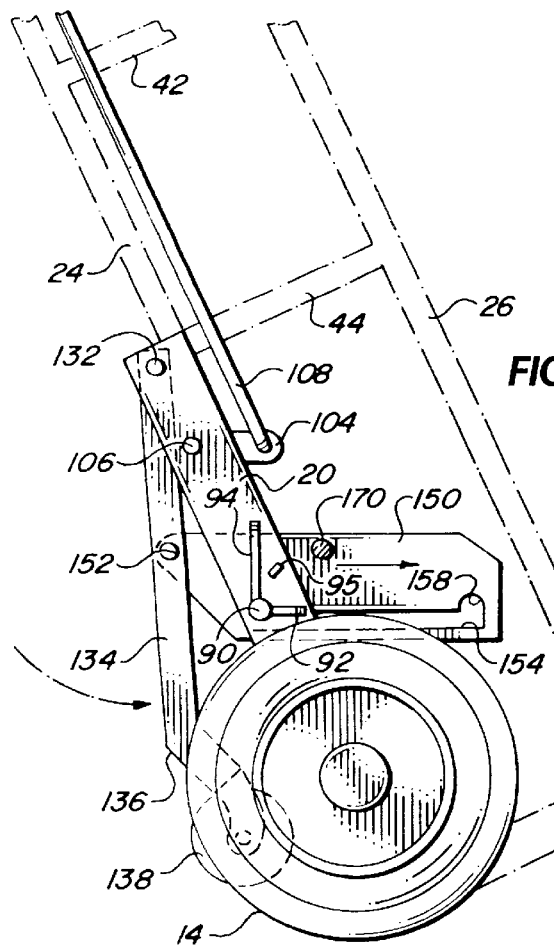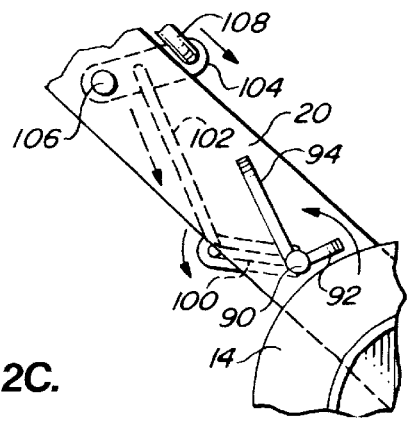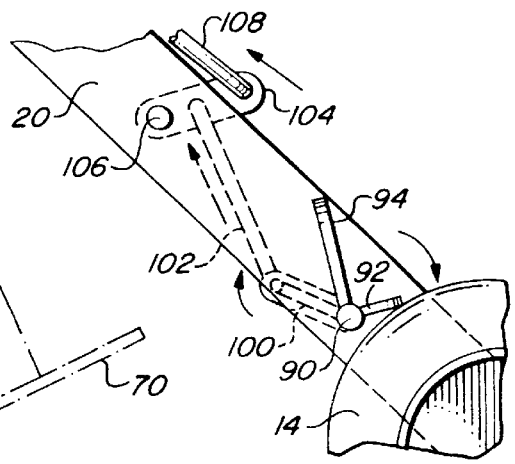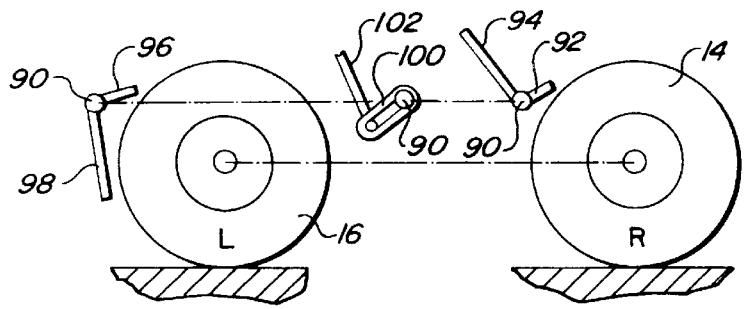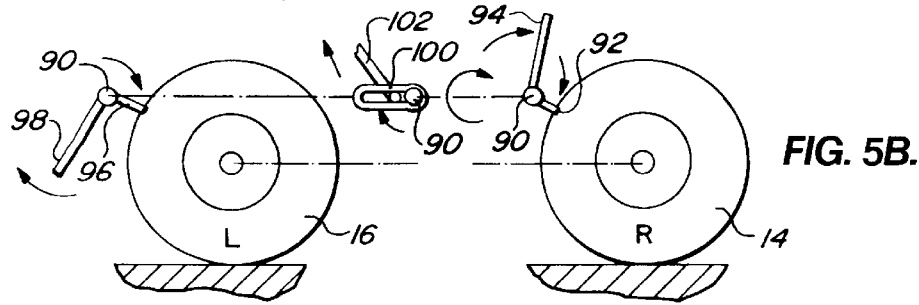

BRAKE AND RETRACTABLE REAR STABILIZER APPARATUS FOR A HAND DOLLY

CROSS REFERENCE TO RELATED APPLICATION

This application is a Continuation of Ser. No. 08/666,607, filed Jun. 18, 1996, now U.S. Pat. No. 5,779,251, which was a Continuation of Ser. No. 08/179,259, filed Jan. 10, 1994 now abandoned.

BACKGROUND OF THE INVENTION

1. Field of the Invention

This invention relates to hand dollies, and, more particularly, to a foot applied brake for a hand dolly and a retractable stabilizer for the hand dolly.

2. Description of the Prior Art

Hand dollies or hand trucks have been used for many years to move a variety of heavy articles. Normally, the hand dolly or hand truck is used by one person. A typical hand truck or dolly includes a pair of side rails with a bottom plate extending outwardly generally perpendicularly to the side rails. A handle portion is secured to the top of the side rails. A pair of wheels is secured to the bottom of the dolly adjacent to the bottom plate and to the side rails. The article or load to be moved is maneuvered onto the bottom plate, and the dolly, with the article disposed thereon, is tilted backwards by the user and the dolly and the article are then moved, as desired.

There are provisions on some dollies for going up and down stairs. The provisions for going up and down stairs generally include a pair of belts, one belt on each side of the dolly apparatus, and each belt extends between a pair of pulleys. The belts move generally parallel to the side rails of the dolly. The belts are, of course, free wheeling, and they simply comprise support elements on which the dolly apparatus moves upwardly and downwardly on the stairs.

To the best of the knowledge of the inventor hereof, there are no provisions for brakes on dollies of the prior art.

One of the problems inherent with prior art hand trucks or dollies is in the movement of relatively tall or long and heavy elements. The balancing of such elements on dollies can become very difficult and dangerous. If the wheels can be locked, it is much safer and easier to tilt the dolly apparatus and load backward for moving the apparatus and load.

The apparatus of the present invention includes brake elements actuable by hand, and stabilizer wheels on a stabilizer frame secured to a retractable frame which may be used as desired. The brake elements may be set by foot operation of the user of the dolly apparatus, and may be released either by foot operation or by moving the dolly forwardly. The hand operation of the brake apparatus is used only to "feather" the brake, and will not set the brake. In the use orientation, the stabilizer frame and wheels are used to provide support for the dolly to prevent the dolly from tipping over backwards when tall or long and heavy elements are moved onto the dolly. The stabilizer may be retracted when not needed.

SUMMARY OF THE INVENTION

The invention described and claimed herein comprises dolly apparatus with brake elements actuable and releasable by foot operation of the user, for setting and releasing the brake. The brake may also be actuated by hand operation, but the hand operation will not set the brake. The brake elements include plates movable against a wheel to prevent the wheel from moving backwards or in the rear position. The apparatus of the present invention also includes a retractable pair of stabilizer wheels disposed on a stabilizer frame and movable to a down or use position and to an up and storage position, as desired. The stabilizer frame is secured to the main frame of the dolly and pivots thereon between a stowed position and a down, use position.

Among the objects of the present invention are the following:

To provide new and useful dolly apparatus;

To provide new and useful dolly apparatus including a brake for dolly wheels;

To provide new and useful brake apparatus for a dolly;

To provide a hand truck with a hand actuable brake;

To provide new and useful dolly apparatus having a pair of stabilizer wheels to stabilize a dolly in a desired orientation;

To provide new and useful dolly apparatus including a pair of stabilizer wheels on a stabilizer frame pivotally secured to the frame of the dolly and movable between a down and use position and up and storage position; and To provide new and useful hand truck apparatus having a foot operated brake and a stabilizer frame having a pair of stabilizer wheels secured to the main frame of the hand truck in a pivoting relationship.

BRIEF DESCRIPTION OF THE DRAWING

FIG. 1 is a perspective view of the apparatus of the present invention in its use embodiment.

FIG. 2A is a side view of a portion of the apparatus of the present invention illustrating the operation of a portion of the apparatus of the present invention.

FIG. 2B is a side view of a portion of the apparatus of the present invention sequentially following FIG. 2A.

FIG. 2C is a side view illustrating the operation of a portion of the apparatus of the present invention sequentially following FIG. 2B.

FIG. 3 is a side view of a portion of the apparatus of the present invention illustrating another portion of the apparatus of the present invention.

FIG. 4 is a side view of a portion of the apparatus of the present invention sequentially following FIG. 4.

FIG. 5A is a schematic representation illustrating elements of the apparatus of the present invention.

FIG. 5B is a schematic representation of the elements of FIG. 5A and illustrating sequentially, the operation of the elements.

DESCRIPTION OF THE PREFERRED EMBODIMENT

FIG. 1 is a perspective view of dolly apparatus 10 of the present invention. The dolly apparatus 10 is a hand dolly or a hand truck with two assemblies included therein, including a brake assembly and a dolly assembly. These features will be discussed in detail below.

The dolly apparatus 10 includes an axle 12 to which are secured two wheels 14 and 16. Extending radially outwardly from the axle 12, and appropriately journaled thereto for rotation, are two brackets 20 and 22. The bracket 20 may be referred to as the right bracket and the bracket 22 may be referred to as a left bracket. The brackets 20 and 22 are essentially plates to which the brake assembly and the dolly assembly are secured.

Extending upwardly from the bracket or plate 20 is a right rear arm 24. Generally parallel to the right rear arm 24 is a right front arm 26. A curved top portion 28 extends between the two arms 24 and 26.

A similar pair of arms, left arms, extend generally parallel to the arms 24 and 26 and their curved top joining portion 28. They include a left rear arm 30 which is appropriately secured to the bracket or plate 22, and a left front arm 32 and a curved top portion 34.

The arms 24 and 26 are appropriately stabilized or supported by braces, including a top brace 40, an intermediate side brace 42, and a lower side brace 44. Similarly, there are three brace elements between the arms 30 and 32, including a top brace 46, an intermediate brace, and a lower brace 50. Extending between the top braces 40 and 46 is a cross brace 60. The cross brace 60, along with the top curved portions 28 and 34, conveniently act as handle elements for maneuvering the dolly apparatus 10. A cross plate 62 extends between the right intermediate brace 42 and its generally parallel left intermediate side brace, not shown, which extends between the arms 30 and 32.

As may be understood, the front arms 26 and 32 are used to help support the load, and the rear arms 24 and 30, along with the top cross brace 60, are grasped by a user to move and maneuver the dolly apparatus 10 with its load.

A bottom platform 70 extends outwardly or forwardly from the front arms 26 and 32. The platform 70 receives load elements or goods to be transported, as is well known and understood. For purposes of clarity of the illustration, the elements which help to stabilize the platform 70 and to secure it to the axle 12 and to the side brackets or plates 20 and 22 have been omitted.

Details of the brake assembly are shown in FIGS. 1, 2A, 2B, 2C, 3, and 4. FIGS. 2A, 2B and 2C are side views showing elements of a stabilizer assembly 130 and some of the elements involved in the brake assembly. FIGS. 3 and 4 are side fragmentary views of a portion of the brake assembly, and FIGS. 6A and 6B are schematic illustrations of a portion of the brake assembly. For the following discussion, reference will be made to all of the drawing Figures, as appropriate.

Specific reference will be made, also as appropriate.

The brake assembly includes a brake shaft 90 which is appropriately secured to the plates or bracket 20 and 22. The brake shaft 90 is journaled for rotation on or between the brackets or plates 20 and 22. Extending radially outwardly from the brake shaft 90 is a right brake plate 92. A right set plate 94 also extends radially outwardly from the brake shaft 90 adjacent to the plate 92. The plates 92 and 94 are disposed generally perpendicular to each other.

The set plate 94 extends radially outwardly from the shaft 90 a greater distance than does the brake plate 92. That is, the set plate 94 is longer than the brake plate 92. The plates 92 and 94 are adjacent to the right wheel 14. The brake plate 92 contacts the wheel 14 to set the brake.

A pair of plates is also secured to the brake shaft 90 adjacent to the wheel 16. The plates include a left brake plate 96 and a left release plate 98. Like the plates 92 and 94, the plates 96 and 98 also extend radially outwardly from the shaft 90. The brake plate 96 and a release plate 98 are oriented differently with respect to the brake shaft 90 from the plates 92 and 94, as best shown in FIGS. 5A and 5B.

FIGS. 5A and 5B are diagrammatic or schematic illustration of the wheels 14 and 16, with the shaft 90 and the plates 92, 94 and 96, 98, respectively, secured thereto.

The application and release of the brake plates 92 and 96 may be best illustrated by reference to FIGS. 5A and 5B. To apply the brakes, the plate 94 may be pushed by the foot of the user of the dolly apparatus 10. A forward or clockwise force on the plate 94, as illustrated by the large arrow in FIG. 4 and also in FIG. 5B adjacent to the plate 94, causes a clockwise rotation of the shaft 90 so that the brake plate 92 contacts the wheel 14 to apply the brake. At the same time, the clockwise rotation of the shaft 90 also causes the plate 96 to contact the wheel 16.

It will be noted that the terms "clockwise" and "counterclockwise" as used herein refers to the directions as noted in FIGS. 1, 2A, 2B, 2C, 3, and 4 in the drawing, and relative to the "night" wheel 14 in FIGS. 5A and 5B. That is, viewing the apparatus 10 from the right side as depicted in FIGS. 1, 2A, 2B, 2C, 3, and 4, etc.

It will also be noted that the plates 92 and 96 are generally parallel to each other, and accordingly the application of the brake plate 92 and the brake plate 96 is substantially simultaneous. It will be further noted that it is specifically the edges and not the flats of the plates 92 and 96 which contact the wheels. This is best shown in FIGS. 4, 5A and 5B.

However, the brake release plate 98 extends in an opposite direction relative to the shaft 90 from the brake apply plate or brake set plate 94. Accordingly, the clockwise rotation of the shaft 90 to apply the brakes rotates the brake release plate 98 away from the wheel 16. To release the brakes, the foot of the user of the dolly apparatus 10 pushes against the brake release plate 98 to rotate the shaft in a counterclockwise direction to release the brake plates 92 and 96.

Stop elements limit the rotation of the shaft 90 by limiting the movements of the plates 94 and 98. A stop element 95 is shown in FIG. 2C limiting the pivoting "set" or "on" movement of the brake plates 92 and 96. The stop element 95 limits the movement of the right set plate 94 against the wheel 14. The element 95 also limits the movement of the left set plate 96 because both plates are fixed to the shaft 90. Accordingly, the stop element 95 limits the pivoting movement of the plate 94, the shaft 90, the plate 92 and the plate 96. There is a corresponding stop element, not shown, which limits the "off" or "release" pivoting movement of the brake release plate 99 and the associated elements 96, 90, 92, and 94.

When the brakes are set, they may be released either through the brake release plate 98, as discussed above, or merely through the forward movement of the dolly apparatus 10. The positive forward movement of the dolly apparatus 10, as by movement of the dolly by the user, will cause the rotation of the wheels 14 and 16 in a positive or clockwise direction to move the brakes or brake plates 92 and 96 away from the wheels, thus releasing the brakes automatically. Thus, if it is unhandy for a user to tap or move the brake release plate 98 to cause the brakes to be released, the positive forward movement of the dolly apparatus 10 will automatically release the brakes by the simple counterclockwise rotation of the brake shaft 90 as the wheels move against the brake plates 92 and 96.

The forward movement, or clockwise rotation, of the wheels releases the brakes due to the geometry of the brake plates 92 and 96 and the brake axle 90 relative to the wheels 14 and 16 and their axle 12. This may best be understood from FIG. 5B.

In addition to applying a brake by setting the brakes through the set plate 94, the brakes may also be "feathered" to the on position while the dolly apparatus 10 is being moved by applying a hand actuated brake connector system This is best shown in FIGS. 2A, 3, and 4.

A brake applying link 100 is appropriately secured to the brake shaft 90, as by welding. The link 100 is pivoted by a connecting rod 102. The connecting rod 102 is in turn connected to an actuation link or arm 104. The actuation link or arm 104 is pivotally secured to the plate or bracket 20 The actuation link or arm 104 pivots on the plate or bracket 20 through a pivot pin 106 The link or arm 104 is connected remote from the pivot pin 106 to a brake rod 108. The connecting rod 102 is pivotally secured to the link 104 between the pivot pin 106 and the outer end of the link 104 to which the brake rod 108 is secured. The brake rod 108 extends upwardly, through the cross plate 62, and terminates in a brake handle 110 adjacent to the top cross brace or handle 60.

While the dolly apparatus 10 is moving, if the user desires to slow the rolling movement of the dolly apparatus 10, the brake handle 110 is raised vertically, and the upwardly movement of the handle 110 and the rod 108 causes the link 104 to pivot upwardly. The upward movement of the link 104 in turn causes the connecting rod 102 to move upwardly, thus pivoting the brake rod 90 in a clockwise movement through the link 100. The clockwise pivoting movement causes the brake plate 92 and the brake plate 96 to move against the wheels 14 and 16, respectively, to slow the rolling movement of the wheels and the dolly apparatus 10.

The feathering brake action will not cause the brakes to be set or to be fully applied, but will substantially slow down the rotation of the wheels, and in turn the dolly apparatus 10 slows and may even be brought to a stop.

Referring to FIGS. 2A, 4, 5, 6, the link 100 is illustrated as an open link or loop in which the bottom or lower position of the connecting rod 102 moves when the shaft 90 is pivoted by the brake set or apply plate 94. Otherwise, the bottom end of the connecting rod 102 could not move in the link 100, and the feathering handle 100 would move upwardly each time the plate 94 was actuated to set the brake plates 92 and 96. With the bottom end of the rod 102 movable in the link 100 when the plate 94 is actuated, the handle 110 remains in its "normal" position, and doesn't move upwardly to possibly squeeze the user's fingers against the cross brace 60. Thus, when the brake plates 92 and 96 are "off", the bottom of the rod 102 is at the top or outer end of the link 100 so that the upward movement of the handle 110 causes the pivoting of the shaft 90 to feather the brakes "on" to slow down the rotation of the wheels 14 and 16.

The second system included in the dolly apparatus 10 is the dolly support or stabilization assembly 130 The dolly support assembly 130 is illustrated in FIGS. 1, 2A, 2B, and 2C. In FIGS. 1, 2A, and 2B, the dolly support assembly 130 is shown in its use orientation, or "down" to help support or stabilize the dolly apparatus 10. In FIG. 2C, the dolly support assembly 130 is shown in its stowed or "up" position, in which the main dolly wheels 14 and 16 only are used to support and move a load disposed on the platform or plate 70.

The dolly support assembly 130 includes a cross beam 132 which is appropriately journaled for rotation on the plates or brackets 20 and 22. The cross beam 132 extends between the upper portion of the plates 20 and 22. Extending outwardly from, and appropriately secured to, the cross beam 132 are two upper legs, including an upper leg 134 and an upper leg 140. Extending downwardly from the lower end of the upper leg 134, remote from the cross beam 132, is a lower right leg element 136. A similar left lower leg 142 extends downwardly from the lower, outer end of the left upper leg 140, again remote from the cross beam 132.

At the bottom of the right lower leg 136 is a right wheel 138. At the bottom of the left lower leg 142 is a left lower wheel 144. The wheels 138 and 144 are preferably caster wheels, and they are relatively small in comparison to the main wheels 14 and 16.

Extending between the lower leg elements 136 and 142 is a bottom cross beam 146.

The dolly support assembly 130 pivots on the plates or brackets 20 and 22 between the up, or stowed position and the down, use position through a pair of link members 150 and 160. The link element 150 is a right link member, and the link element 160 is a left link member. The right link member 150 is pivotally secured to the leg 134 by means of a pivot element 152. The left link 160 is pivotally secured to the leg 140 by a left pivot element 162.

Extending longitudinally through the right link member 150 is a slot 154. The slot 154 includes a pair of upwardly extending slots or detents, including a front detent 156 and a rear detent 158. Similarly, the left link member 160 includes a longitudinally extending slot 164, and the slot 164 includes a pair of upwardly extending slots or detents, including a front detent 166 and a rear detent 168.

As best shown in FIG. 1, a cross brace 170 extends between the links 150 and 160. The cross brace 170 is appropriately secured to the links 150 and 160, as by welding.

The brake shaft 90 is disposed in the slots 154 and 164. When the brake shaft 90 is disposed in the front detents 156 and 166 of the slots 150 and 160, respectively, the dolly support assembly 130 is in its down position, as shown in FIGS. 1 and 2A, rearwardly of the platform 70.

In FIG. 2B, the large arrow indicates that the link 150 is moved upwardly to cause the detent 156 to move upwardly, away from the shaft 90. Or, in other words, the shaft 90 moves out of the detent 156. When the shaft 90 is out of the detent 156, a dolly assembly 130 may be moved inwardly, as indicated by the large arrow adjacent to the legs 134 and 136. Of course, the link 160 moves in parallel with the link 150. The dolly assembly may then be moved inwardly, and the shaft 90 will then move into the slots 154 and 164. As the shaft 90 moves into the rear detents 158 and 168, the dolly support assembly 130 is then in its stowed or up position, as shown in FIG. 2C.

To move the dolly support assembly 130 from its up or storage or stowed position, the reverse process is accomplished. The upward movement of the links 150 and 160 is first accomplished to move the shaft 90 out of the rear detents 158 and 168. The dolly assembly is then moved rearwardly, and the shaft 90 moves in the front detents or slots 154 and 164. When the shaft 90 moves into the front detents 156 and 166, the dolly support assembly is in its down, use, position, as shown in FIGS. 1 and 2A.

The dolly support assembly 130 in its down, use, position, rearwardly of the platform 70, provides rear stability for the dolly apparatus 10 and a relatively large, heavy load disposed on the platform. The load may then be moved on the dolly apparatus 10, as desired. It will be noted that the action or functioning of the dolly support assembly 130 is independent of the brake system described above.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What I claim is:

1. Dolly apparatus comprising in combination:

platform means for supporting an article to be moved including a platform for receiving the article to be moved and comprising a forward portion of the dolly apparatus;

a pair of wheels secured to and rearward of the platform for moving the platform means and the article;

handle means secured to and extending upwardly from the platform and secured to the pair of wheels for grasping by a user to move the dolly apparatus;

brake means secured to the handle means for contacting the wheels, including
 a shaft secured to the handle means and pivotable in a clockwise direction and in a counterclockwise direction,
 a first brake plate secured to the shaft and disposed adjacent to one wheel of the pair of wheels for contacting the one wheel in response to pivoting of the shaft in the clockwise direction,
 a second brake plate secured to the shaft and disposed adjacent to the other wheel of the pair of wheels for contacting the other wheel in response to pivoting of the shaft in the clockwise direction, and means for pivoting the shaft in the clockwise direction to provide contact by the first and second brake plates against the pair of wheels; and a stop element for limiting the rotation of the shaft in the clockwise direction and accordingly of the first and second brake plates against the wheels, whereby the first and second brake plates will be released from contacting the wheels by a forward movement of the dolly apparatus to move the wheels in the clockwise direction to move the brake plates and their shaft in the counterclockwise direction to move the brake plates away from the wheels.

2. The apparatus of claim 1 in which the means for pivoting the shaft in the clockwise direction includes a brake apply plate secured to the shaft.

3. The apparatus of claim 2 in which the brake means further includes means for pivoting the shaft in the counterclockwise direction to release the first and second brake plates from contact with the pair of wheels.

4. The apparatus of claim 3 in which the means for pivoting the shaft in the counterclockwise direction includes a brake release plate secured to the shaft.

5. The apparatus of claim 2 in which the means for pivoting the shaft in the clockwise direction includes a brake rod linked to the shaft and disposed adjacent to the handle means for feathering the first and second brake plates against the first and second wheels while the user's hands are holding onto the handle means.

6. The apparatus of claim 5 in which the handle means includes first arm means and second arm means spaced apart from each other and secured to the platform means for grasping by a user.

7. The apparatus of claim 6 in which the handle means further includes brace means extending between the first and second arm means for bracing the first and second arm means and for grasping by a user, and the brake rod is disposed adjacent to the brace means.

8. The apparatus of claim 1 in which the platform means further includes means for stabilizing the platform.

9. The apparatus of claim 8 in which the means for stabilizing the platform includes a frame secured to the handle means and pivotable between an up, storage, position, and a down, use, position rearward of the platform.

10. The apparatus of claim 9 in which the means for stabilizing the platform further includes another pair of wheels secured to the frame for moving the platform means when the frame is in the down, use, position.

* * * * *